United States Patent

Barna

[11] 3,886,058
[45] May 27, 1975

[54] GAS SENSING ELECTRODE SYSTEM EMPLOYING HYDROPHILIC WICK

[75] Inventor: Gabriel G. Barna, Richardson, Tex.

[73] Assignee: Texas Instruments Incorporated, Dallas, Tex.

[22] Filed: July 30, 1973

[21] Appl. No.: 383,923

[52] U.S. Cl. .................... 204/195 P; 204/195 R
[51] Int. Cl. ............................. G01n 27/46
[58] Field of Search ........ 204/195 P, 195 R, 195 G, 204/195 M, 195 L, 195 B, 195 F, 1 T

[56] References Cited
UNITED STATES PATENTS

| | | | |
|---|---|---|---|
| 2,943,028 | 6/1960 | Thayer et al. | 204/195 R |
| 3,088,905 | 5/1963 | Glover | 204/195 P |
| 3,196,100 | 7/1965 | Digby | 204/195 P |
| 3,325,378 | 6/1967 | Greene et al. | 204/1 T |
| 3,357,908 | 12/1967 | Riseman et al. | 204/195 P |
| 3,649,505 | 3/1972 | Strickler et al. | 204/195 P |
| 3,755,125 | 8/1973 | Shaw et al. | 204/195 P |
| 3,764,504 | 10/1973 | Arff et al. | 204/195 P |
| 3,787,308 | 1/1974 | Malaspina et al. | 204/195 P |

Primary Examiner—G. L. Kaplan
Attorney, Agent, or Firm—Harold Levine; James T. Comfort; William C. Hiller

[57] ABSTRACT

An electro-chemical, gas-detection sensing system employing a non-porous sensing electrode, preferably operating in the potentiometric mode, having a hydrophilic wick for maintaining an electrode/electrolyte interface path with the minimum possible volume of electrolyte.

2 Claims, 3 Drawing Figures

GAS SENSING ELECTRODE SYSTEM EMPLOYING HYDROPHILIC WICK

BACKGROUND OF THE INVENTION

1. Field of the Invention

This invention relates to electro-chemical gas sensing and particularly to such sensing employing nonporous electrodes.

2. Description of the Prior Art

There are two distinct methods of quantitatively, electro-chemically sensing gases: potentiostatically and potentiometrically. In the potentiostatic method or mode, a sensing electrode is potentiostated at a fixed potential with respect to a reference electrode. The gas to be quantitatively sensed or detected contacts the sensing electrode in the presence of an electrolyte, and generates a current that is linearly proportional to the concentration of the gas at the electrode.

In the potentiometric method, the open circuit voltage is measured between a reference and a sensing electrode, the sensed gas being exposed to the sensing electrode in the presence of an electrolyte. The open circuit voltage is logarithmically related to the concentration of the gas at the sensing electrode through the classical Nernst relationship. The only accessory required in the potentiometric method is a high impedance voltmeter; therefore, this method is inherently simple and cost-efficient.

Two types of electrodes are employable in either of the two methods: porous and non-porous. Of the two, the porous electrode in the potentiostatic fuel cell configuration is the most used. The porous electrode gives rise to a high surface area and consequently increases the electrode/electrolyte interface. A maximum interface area maximizes the current output of the system. The electrode material acts as a gas-permeable membrane itself and provides a physical boundary between the electrolyte and the gas.

On the other hand, a gas-permeable membrane must be used with a non-porous electrode. The membrane limits the quantity of the electrolyte between the electrode and the gas by allowing only a very thin thickness to exist, and thus enhances the rate of response. The membrane functions as the gas-permeable physical boundary between the gas and the electrolyte and the non-porous electrode provides the surface upon which the electrode reaction takes place. The sensing area of the electrode is reduced when compared to a porous electrode face of the same size, but so long as the entire sensing surface area is covered by a thin film of electrolyte, such a configuration is acceptable for operating in the potentiostatic mode.

In contradistinction to the role of the electrode surface interface in the potentiostatic mode, the amount of electrolyte in contact with the gas and the electrode in the potentiometric mode is immaterial as long as there is an electrolyte path across the surface of the electrode. In this operating mode, the measured variable is the opencircuit potential. At a given gas concentration, the Nernstian potential is an intensive property of the system and is independent of the size of the electrode/electrolyte interface. If the electrolyte path can be maintained, it is a distinct advantage that the amount of electrolyte be limited to accelerate response and recovery times for the sensing electrode.

To minimize the electrode/electrolyte interface, the non-porous electrode with a membrane have been used, as described above. (A porous electrode inherently provides a large interface for the electrolyte.) The membrane is placed as close to the surface of the electrode as possible.

The problems with such prior art assemblies are many fold, however. If the membrane is placed in contact with the surface of the electrode, which would ordinarily be an ideal situation, the electrolyte is squeezed out altogether from the electrode/membrane interface and hence there is no ohmic continuity. The problem is worsened because the gas being detected through the gas-permeable membrane will tend to dry out or keep dry the electrode surface, which desperately needs to be somewhat wet with electrolyte to have an operable system.

Mechanical O-ring spacer or spacers have been used, but the use of hydrophobic O-rings have not been totally successful. This is probably because they provide too much space between the membrane and electrode surface, create an adverse ohmic effect on the electrical circuit when used with a sensing electrode operating in the potentiostatic mode and/or provide non-uniform spacing for a membrane that readily flexes when subjected to the flow of the sensing gas.

Therefore, it is a feature of this invention to provide an improved electro-chemical gas detection system employing a non-porous electrode.

It is another feature of this invention to provide an improved potentiometric electro-chemical gas detection system having improved response and recovery time characteristics.

It is still another feature of this invention to provide in one embodiment thereof, an improved electro-chemical gas detection system operating in a potentiometric mode employing a non-porous electrode in conjunction with a gas-permeable membrane without using mechanical spacers as employed in the art.

It is yet another feature of this invention to provide, in another embodiment thereof, an improved electro-chemical gas detection system operating in a potentiometric mode employing a non-porous electrode which does not use a gas-permeable membrane.

SUMMARY OF THE INVENTION

An embodiment of the present invention provides an electro-chemical gas detection system employing a non-porous sensing electrode and a gas-permeable membrane in confronting relationship with the sensing surface thereof, the detected gas being applied to the membrane. A hydrophilic wick is placed across the face of the sensing electrode so as to stretch the membrane thereacross. The wick provides a path for ohmic contact of the electrolyte across the sensing surface of the electrode with the electrolyte surrounding the sensing electrode on either side thereof.

Another embodiment of the present invention is similar to the first except that there is no membrane and the sensing surface extends above the electrolyte. The wick is placed across the sensing face and again contacts the electrolyte on either side of the electrode. The gas to be detected is applied directly to the surface of the electrolyte at the sensing electrode, the absorbed electrolyte in the wick acting as the required electrode/electrolyte interface.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings.

DESCRIPTION OF PREFERRED EMBODIMENTS

Figure 1:
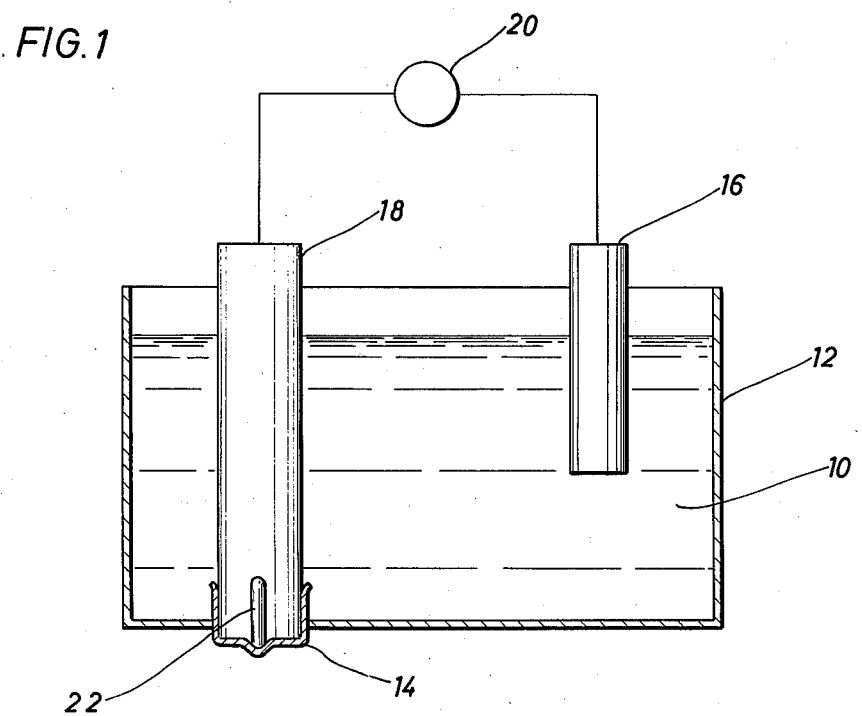
FIG. 1 is a cross-section of a simplified first embodiment of the present invention, partially in an exploded form.

Now referring to the drawings and first to FIG. 1, a simplified first embodiment of the invention is illustrated in a cross-sectional drawing. An electrochemical gas detection cell of the potentiometric type is illustrated. The cell includes a liquid housing, electrolyte 10 being contained within walls 12 of said housing. The electrolyte is typically an aqueous solution of inorganic salt, but other convenient liquids may be employed, including water to which additives have been introduced.

An opening in the bottom of the housing has a gas-permeable membrane 14 attached thereacross by any suitable means, such as by an insoluble adhesive. The membrane may be of any suitable substance, but typically it is made of Teflon or some other plastic material or rubber. It is characterized, in addition to being gas-permeable, by being thin, flexible and somewhat tough.

A reference electrode 16 is suspended in electrolyte 10 by any convenient means (not shown), such that a substantial portion is submerged. An exposed portion extends above the electrolyte. The reference electrode may be formed of standard materials, such as silver chloride on a silver screen, tantalum, or the like, as is well known in the art. Examples of such an electrode are set forth in "Reference Electrodes," D. Ives and G. Janz, Academic Press, N.Y. 1961.

A non-porous sensing electrode 18, spatially separated from electrode 16, is also submerged in electrolyte 10, the top portion of which, like electrode 16, is exposed above the electrolyte.

Sensing electrode 18 may be formed of any conducting material. One example of a suitable material is chalcogenide glass, one embodiment thereof being an 1173 glass which has been doped with iron, cobalt, nickel or the selenides of iron, cobalt and nickel as impurities. The 1173 glass is fully set forth in the Journal of the Electro-Chemical Society, Volume 118, No. 4, April 1971, at pages 571–576.

Wire connections to the exposed portions of both electrodes 16 and 18 connect high impedance voltmeter 20 therebetween.

The sensing, or bottom, surface of electrode 18 has placed thereacross a thin porous fiber or thread, the opposing ends thereof extending alongside the electrode. As will be hereafter explained, in operation, this fiber becomes a hydrophilic wick 22. The sensing end of electrode 18 is pressed into membrane 14 such that the membrane stretches tightly across the sensing surface of electrode 18 and wick 22. When in position, the sensing, or bottom, portion of electrode 18 is cupped by membrane 14, as more fully shown in the blown-up portion of FIG. 1. Note that the ends of wick 22 are sufficiently long that they remain exposed to electrolyte 10.

The pressing of electrode 18 into membrane 14 has the effect of squeezing out the electrolyte between the sensing surface of electrode 18 and membrane 14. However, the hydrophilic effect of wick 22 maintains an absorbed path of electrolyte across the sensing surface along the thread, thereby maintaining an electrode-electrolyte-membrane interface.

In operation of the gas detector shown in FIG. 1, the cell is conventionally operated in the familiar potentiometric mode. The gas to be detected is passed by membrane 14, for example, via an adjoining chamber (not shown) through which the gas is drawn. The open-circuit potential as measured on voltmeter 20 is related logarithmically to the concentration of the gas at the sensing surface of electrode 18.

Note that the amount of electrolyte in contact with the gas and the electrode is minimized. The electrolyte, however, is always present across a portion of the sensing face of the electrode. The Nernstian relationship upon which the operation is based is independent of the size of the electrode/electrolyte interface. The limited amount of electrolyte, however, does give use to accelerated response and recovery times.

A laboratory comparison between the system as shown and described for FIG. 1 was compared with a potentiometric gas sensing system using a 45 mil spacer. After a steady state potential was obtained for a flow of air, test gas was introduced and the initial response rate was monitored. The gas was subsequently turned off and the system was purged with air while the initial rate of recovery was again monitored. The rates of responses and recoveries were as follows:

|  | Using Mechanical Spacer | Using Wick |
|---|---|---|
| Response | +10 mV/3 min. | +127 mV/3 min. |
| Recovery | − 7 mV/3 min. | − 70 mV/3 min. |

The thread used for wick 22 may be of any convenient porous fiber. Cotton and nylon are acceptable. A jell, such as collodion, is not satisfactory in that it gets squeezed from between the sensing surface of the electrode and the membrane, as with the liquid electrolyte.

Figure 2:
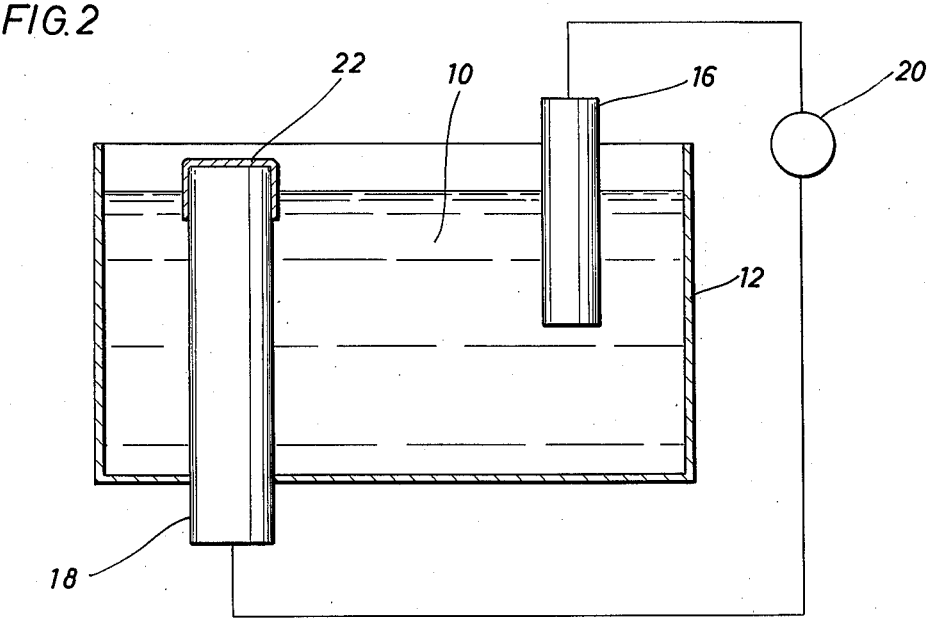
FIG. 2 is a cross-section of a simplified second embodiment of the present invention.

Now referring to FIG. 2, another embodiment of the present invention is illustrated. In this embodiment, electrolyte 10 is contained within walls 12 of the cell housing, as before. Again, reference electrode 16 is suspended in electrolyte 10 by the convenient means (not shown), such that a substantial portion is submerged, leaving an exposed portion extending above the electrolyte.

The non-porous, sensing electrode 18, is again spaced from electrode 16, also with a substantial surface area in the electrolyte. This time, however, the non-sensing surface of electrode 18 extends downward through an opening in the bottom of the cell housing, the fit being such that no electrolyte leaks from around the electrode. Alternatively, electrode 18 may be sealed in the opening of the housing through any convenient means to prevent leaking. Wire connections to both electrodes 16 and 18 connect high impedance voltmeter 20 between the electrodes.

A wick 22 is placed tightly across the sensing surface of electrode 18, which in this case, extends exposed above electrolyte 10. Wick 22 may be identical to the wick employed in the FIG. 1 embodiment; however, in this case there is no membrane. The ends of wick 22 are taped to extend downward into electrolyte 10 to create an electrode/electrolyte path along the wick across the sensing face of the electrode. The gas to be detected or monitored is directed across the surface of the electrolyte at the sensing face of electrode 18.

The elimination of the membrane enhances the rate and amount of response when compared to a system employing a membrane. This is because the degree of permeability of the membrane is a negative contribution to the overall response. Even the most permeable substances are more limiting than a total absence. However, the advantage of having a small amount of electrolyte, as with the FIG. 1 embodiment, is maintained. This makes for a far more responsive system than one employing a sensing surface immersed in the electrolyte.

The feasibility of the FIG. 2 embodiment has been demonstrated. Following assembly, a steady potential was obtained for a period of 4 hours, with air being blown over the electrode surface at the rate of 120 cc/min. In the 4 hour period, a gradual shift of −30 mV was obtained. Removing the wick from the electrode surface instantly caused the potential readings to become erratic, indicating an open circuit condition.

In another performance, the FIG. 2 embodiment was subjected to a test gas of known constituencies, after appropriate purging by air, for a period of 12 minutes. A + 230 mV change was observed. The configuration was altered by the addition of more electrolyte so as to cover the sensing surface of the sensing electrode. The system was again purged using air and the test gas was bubbled into the electrolyte. In a 12 minute period, there was no change in the potential obtained.

Figure 3:
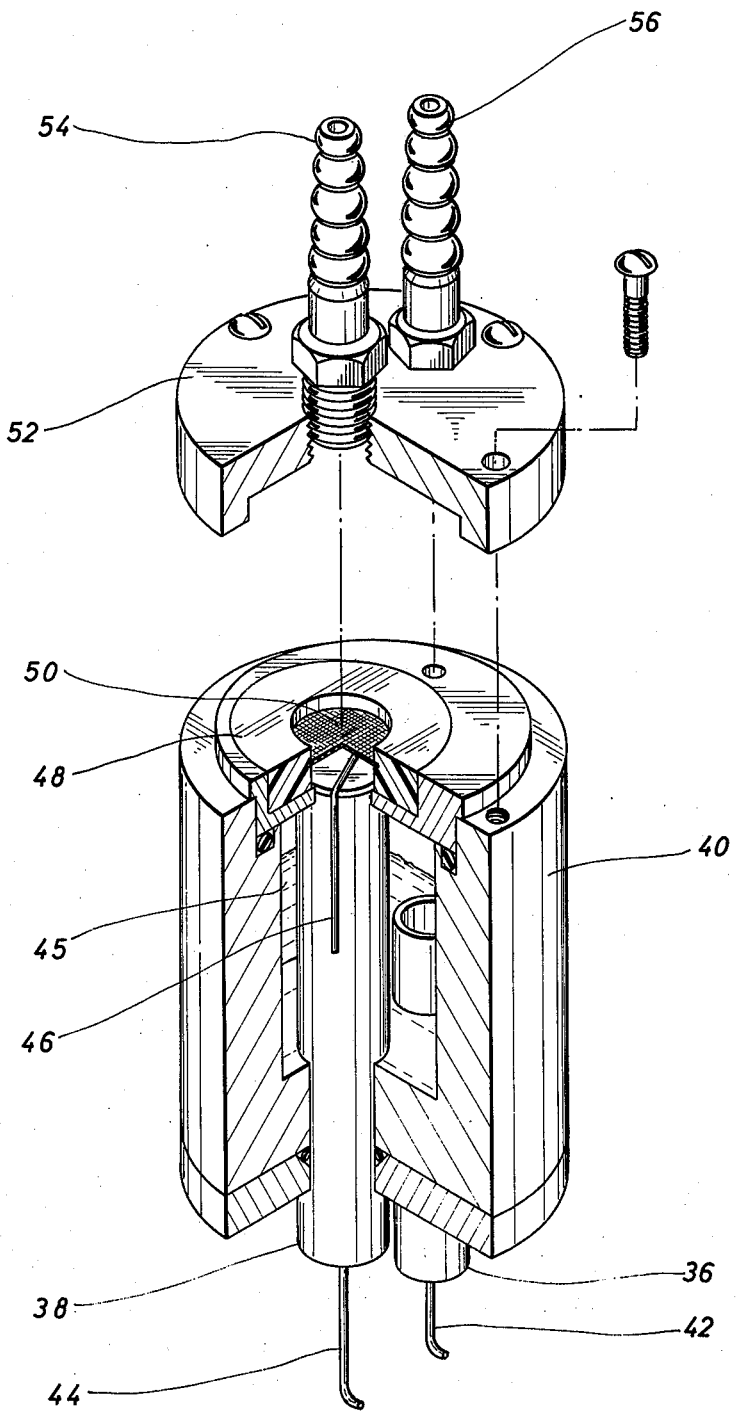
FIG. 3 is a cutaway isometric view of a third embodiment of a gas detection cell in accordance with the present invention.

Now referring to FIG. 3, a commercial embodiment of the invention is illustrated in an oblique cutaway drawing. In this embodiment, reference electrode 36 and sensing electrode 38 are held in a housing 40, wire connecting leads 42 and 44 extending to connect to a high impedance voltmeter (not shown). Electrolyte 45 is introduced into housing so as to completely cover the internal portion of reference electrode 36, but not to completely cover the top of sensing electrode 38, which is somewhat longer. Wick 46 is taped across the top or sensing surface of electrode 38 so that the loose ends extend down into electrolyte 45. The top of housing 40 is closed by a two-part intermediate cover 48 providing a passageway for the introduction of the gas to be monitored over the sensing electrode. This intermediate cover may be secured to housing by screwing into appropriate grooves against conventional O-rings to provide a water-tight seal.

The inside one of the two-part intermediate cover includes a membrane 50 which is positioned close to, but not touching, the sensing surface of the sensing electrode. Top cover assembly 52, is appropriately bolted onto receiving holes in the housing so as to provide an inlet conduit 54 and an outlet conduit 56 having continuity across membrane 50 through the passageway provided by the intermediate cover.

The operation of the FIG. 3 embodiment is identical to the FIG. 2 embodiment, except a membrane is provided. It is provided as a security against spills of the electrolyte. Moreover, the membrane retards the formation of crystals of the electrolyte on the exposed surface and on the wick, thereby increasing short term stability of the system.

By closing the system, the humidity is also kept high, to further ensure that the wicking or absorption quality of wick 46 is maintained constant. Of course, the membrane is not an essential operating component in that the wicking action occurs in the absence of a membrane in the manner previously described.

While particular embodiments of the invention have been shown, it will be understood that the invention is not limited thereto, since many modifications may be made and will become apparent to those skilled in the art.

What is claimed is:

1. An electro-chemical gas detection system, comprising:
   a housing defining a chamber,
   a body of a liquid electrolyte carried by said housing within the chamber defined thereby,
   an elongated reference electrode rod in said housing and being partially immersed in said liquid electrolyte body but having at least one end thereof disposed outwardly of said liquid electrolyte body,
   an elongated non-porous sensing electrode rod in said housing in spaced relation to said reference electrode rod and being partially immersed in said liquid electrolyte body but having both ends thereof disposed outwardly of said liquid electrolyte body,
   one end surface of said non-porous sensing electrode rod comprising a sensing surface to which gas to be monitored is adapted to be exposed,
   meter means electrically connected between said at least one end of said reference electrode rod and the end of said non-porous sensing electrode rod opposite from the end thereof on which said sensing surface is provided, and
   an elongated hydrophilic porous fiber wick extending transversely across said sensing surface of said non-porous sensing electrode rod and into partial immersion with said liquid electrolyte body for providing a small quantity of the liquid electrolyte across said sensing surface through capillary attraction and absorption by said porous fiber wick of the liquid electrolyte to complete an ohmic connection, said porous fiber wick having a relatively small diametral dimension as compared to the width of said sensing surface and covering only a minor portion of the area of said sensing surface.

2. An electro-chemical gas detection system, comprising:
   a housing defining a chamber, said housing having a bottom wall provided with an aperture therein,
   a body of a liquid electrolyte carried by said housing within the chamber defined thereby,
   an elongated reference electrode rod in said housing and being partially immersed in said liquid electrolyte body but having at least one end thereof disposed outwardly of said liquid electrolyte body, an elongated non-porous sensing electrode rod in said housing in spaced relation to said reference electrode rod and being partially immersed in said liquid electrolyte body but having both ends thereof disposed outwardly of said liquid electrolyte body, one end surface of said non-porous sensing electrode rod comprising a sensing surface to which gas to be monitored is adapted to be exposed, the end of said non-porous sensing electrode rod opposite from the end thereof on which said sensing surface is provided extending through the aperture in the bottom wall of said housing in liquid-tight sealed relation to the bottom wall of said housing, cover means closing the top of said housing in liquid-tight sealed relation, said cover means including an inlet passageway in communication with said sensing surface of said non-porous sensing electrode rod for introducing a gaseous body into the interior of the chamber, meter means electrically connected between said at least one end of said reference electrode rod and the end of said non-porous sensing electrode rod opposite from the end thereof on which said sensing surface is provided, an elongated hydrophilic porous fiber wick extending transversely across said sensing surface of said non-porous sensing electrode rod and into partial immersion with said liquid electrolyte body for providing a small quantity of the liquid electrolyte across said sensing surface through capillary attraction and absorption by said porous fiber wick of the liquid electrolyte to complete an ohmic connection, said porous fiber wick having a relatively small diametral dimension as compared to the width of said sensing surface and covering only a minor portion of the area of said sensing surface, and said cover means further including a gas-permeable membrane disposed in said inlet passageway in alignment with said sensing surface and in spaced relation to said porous fiber wick.

* * * * *